April 14, 1959  G. W. PETRAK  2,882,066
VEHICLE WHEEL SUSPENSION ASSEMBLY FOR
CASTER AND CAMBER ADJUSTMENT
Filed Aug. 2, 1957  2 Sheets-Sheet 1

INVENTOR.
GEORGE W. PETRAK,
BY
McMorrow, Berman & Davidson
ATTORNEYS.

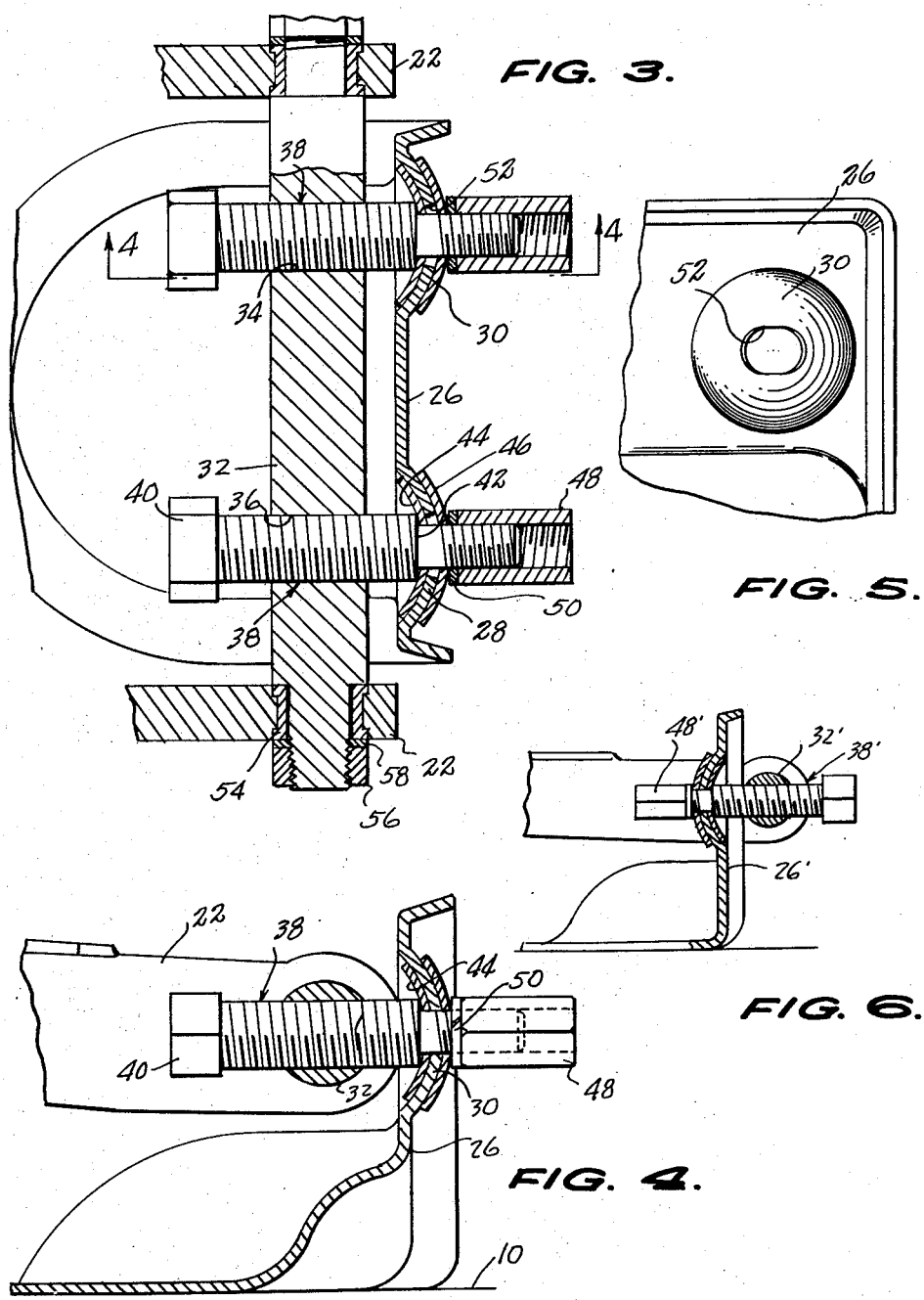

United States Patent Office 2,882,066
Patented Apr. 14, 1959

2,882,066
VEHICLE WHEEL SUSPENSION ASSEMBLY FOR CASTER AND CAMBER ADJUSTMENT

George W. Petrak, Quincy, Wash.

Application August 2, 1957, Serial No. 675,871

2 Claims. (Cl. 280—96.2)

The present invention relates to an independently sprung vehicle wheel suspension assembly.

On object of the present invention is to provide a vehicle wheel suspension assembly which provides for camber and caster adjustment of the wheel without resorting to the use of shims.

Another object of the present invention is to provide a vehicle wheel suspension assembly in which the caster and camber adjustment is readily accomplished without the use of special tools and may be operated by a person having little or no experience.

A further object of the present invention is to provide a vehicle wheel suspension assembly which is sturdily constructed, economical, and which is highly effective in action.

These and other objects and advantages of the present invention will be fully apparent from the following description when taken in connection with the annexed drawings, in which:

Figure 3 is a sectional view taken on the line 3—3 of Figure 2 and on an enlarged scale;

Figure 4 is a sectional view taken on the line 4—4 of Figure 3;

Figure 5 is a fragmentary elevational view of a portion of the support or supporting bracket; and Figure 6 is a sectional view of a modified form of the present invention.

Figure 1:
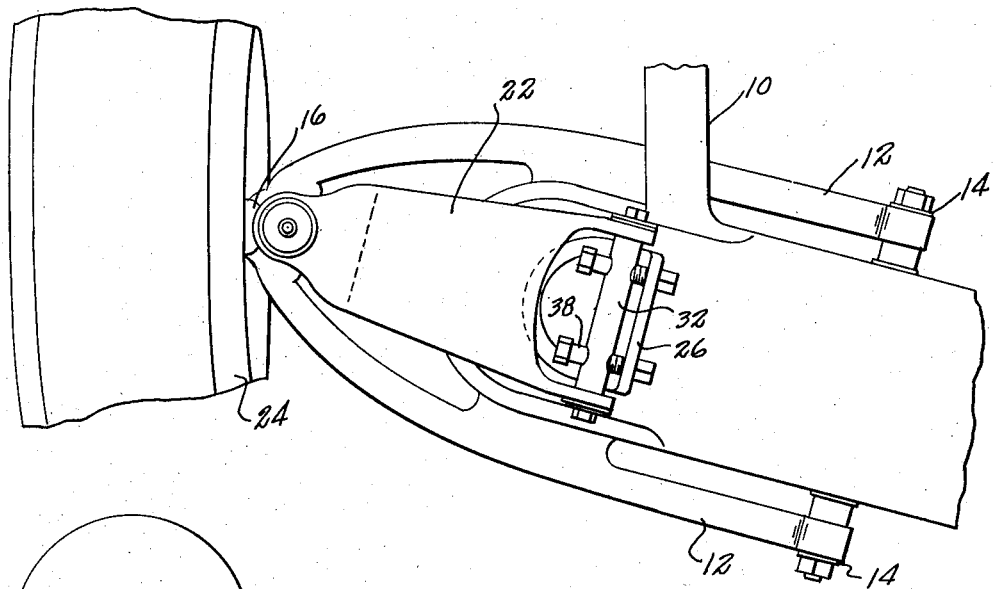
Figure 1 is a plan view of a portion of a vehicle frame, showing the suspension assembly according to the present invention installed thereon and showing a portion of a wheel and tire.
Figure 2:
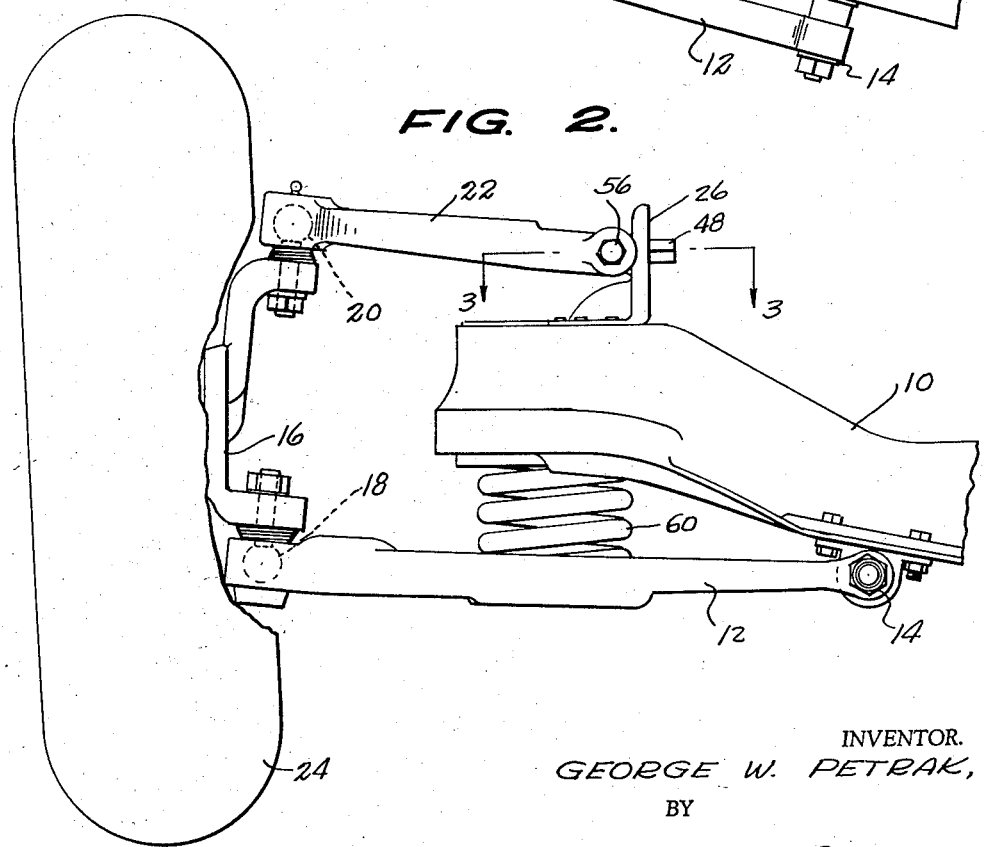
Figure 2 is an elevational view of the assembly shown in Figure 1.

Referring in greater detail to the drawings in which like numerals indicate like parts throughout the several views, the vehicle wheel suspension assembly according to the present invention is used in combination with a vehicle frame 10 having a first arm 12 projecting transversely from one side of the frame 10 adjacent the forward end of the latter, the arm 12 having means on one end thereof, as at 14 in Figure 2, for pivotally connecting the arm 12 to the frame 10.

An upright wheel-carrying member 16 is positioned exteriorly of the frame 10 with a universal joint means, consisting in a ball joint 18, connecting the other end of the first arm 12 to one end of the wheel-carrying member 16.

Another ball joint 20, constituting universal joint means, connects the other end of the member 16 to one end of a second arm 22. A wheel and tire assembly 24 is carried by the member 16 in a conventional manner and is steerable by means not shown as not being a part of the present invention.

The present invention concerns the mounting of the end of the arm 22 remote from the ball joint 20 on the frame 10 in such a support as to provide for the adjustment of the camber and caster of the wheel and tire assembly 24.

As shown most clearly in Figures 3 and 4, the wheel suspension assembly, constituting the present invention, comprises an upstanding support 26 having a pair of slotted cup-shaped or arcuately curved portions 28 and 30 arranged in spaced relation longitudinally of the support 26. The support 26 is positioned transversely of the end of the arm 22 remote from the ball joint 20 and is carried by the adjacent portion of the vehicle frame 10 on the one side of the latter.

A horizontally disposed shaft 32 is positioned in parallel relation with respect to the support 26 and has a portion adjacent each end connected to the support 26 for independent movement toward and away from the support 26. The shaft 32 is provided in the portion of such shaft adjacent each end thereof with a transversely arranged horizontally disposed threaded bore as at 34 and 36 in Figure 3 and a bolt 38 having a head 40 on one end thereof and a shoulder 42 spaced inwardly of the other end is received in each of the bores 34 and 36. A pair of washers 44 and 46, arcuately curved to conform to the curved portions 28 and 30 of the support 26, are positioned on each side of each of the curved portions 28 and 30 and are provided with an aperture in each of them registrable with the slots in the adjacent curved portions of the support 26. Each of the bolts 38 is positioned so that its shoulder 42 bears against the inner washer 44 with the portion of the bolt inwardly of the end remote from the head 40 extending through the support 26 and through the washers 44 and 46. Each of the bolts 38 is independently movable in and out of the associated bore 34 or 36 by means of a wrench (not shown) manually applied. Releasable lock means is provided carried by the portion of each bolt 38 adjacent the end having a shoulder 42 for holding the bolt 38 in any position of its rotational movement. Specifically, this means consists in a nut 48 and a lock washer 50 threadedly mounted on the adjacent end portion of the bolt 38. In Figure 5, it will be seen that the cupped or curved portion 30 of the support 26 is provided with a horizontally arranged closed slot 52.

When the mounting means or suspension assembly according to the present invention is used in a vehicle, the caster of the wheel assembly 24 may be adjusted by moving the bolts 38 inwardly and outwardly of the shaft 32 independently of each other with the nuts 48 backed off enough to permit such movement. Movement of the bolts 38 in the same direction simultaneously will shift the shaft 32 away from the support 26 or toward the support 26 to thereby adjust the camber of the wheel assembly 24.

The bifurcated adjacent end of the arm 22 is provided with a bearing 54 for connecting that end of the arm 22 to the shaft 32 for pivotal movement of the arm 22 about the shaft 32 as an axis. A lock nut 56 with a lock washer 58 retain the adjacent end portions of the arm 22 on the shaft 32.

In Figure 6 is shown a modified form of the invention in which the shaft 32' is on the other side of the bracket or support 26' and the curved portions of the support 26' extend in the opposite direction to the direction in which the support portions 28 and 30 extend. The suspension assembly, in this form of the invention, has the same adjustment for a caster and camber, including bolts 38' and nuts 48', as above described with respect to the first form of the invention.

While the suspension assembly of the present invention has been described with respect to a front wheel of a vehicle, no such limitation is contemplated, and while only a single embodiment of the invention has been illustrated and described, other embodiments may be constructed and numerous changes and modifications may be made therein without departing from the spirit of the invention as set forth in the appended claims.

What is claimed is:

1. In a vehicle wheel suspension assembly, the combination with a vehicle frame, a first arm projecting transversely from one side of said frame adjacent the forward end thereof and having one end pivotally connected to said frame, an upright wheel carrying member, universal joint means connecting the other end of said first arm to one end of said wheel carrying member, a second arm arranged in parallel relation with respect to said first arm, and universal joint means connecting one end of said second arm to the other end of said wheel carrying member, of an upstanding support positioned transversely of the other end of said second arm and carried by the adjacent portions of said vehicle frame one side, said support having a pair of spaced slotted arcuate curved portions, a horizontally disposed shaft positioned in parallel relation with respect to said support, the portion of said shaft adjacent each end being provided with a transversely arranged threaded bore, a pair of washers arcuately curved to conform to the curved portions on said support positioned on each side of each of the curved portions of said support, a bolt having a head on one end and a shoulder inwardly of the other end rotatably movable in each of said bores with the shoulder in abutting engagement with one of said arcuate washers and with the portion of said bolt between said shoulder and said other end extending through said support and the other of said arcuate washers, and releasable lock means threadedly engaging said bolt other end portion for holding said bolt in any position of its rotational movement.

2. In a vehicle wheel suspension assembly, the combination with a vehicle frame, a first arm projecting transversely from one side of said frame adjacent the forward end thereof and having one end pivotally connected to said frame, an upright wheel carrying member, universal joint means connecting the other end of said first arm to one end of said wheel carrying member, a second arm arranged in parallel relation with respect to said first arm, and universal joint means connecting one end of said second arm to the other end of said wheel carrying member, of an upstanding support positioned transversely of the other end of said second arm and carried by the adjacent portion of said vehicle frame one side, a horizontally disposed shaft positioned in parallel relation with respect to said support, said support having a pair of spaced slotted arcuate curved portions, the portion of said shaft adjacent each end being provided with a transversely arranged threaded bore, a pair of washers arcuately curved to conform to the curved portions on said support positioned on each side of each of the curved portions of said support, a bolt having a head on one end and a shoulder inwardly of the other end rotatably movable in each of said bores with the shoulder in abutting engagement with one of said arcuate washers and with the portion of said bolt between said shoulder and said other end extending through said support and the other of said arcuate washers, and releasable lock means carried by said bolt other end portion for holding said bolt in any position of its rotational movement, said lock means embodying a nut and lock washer threadedly mounted on said bolt other end portion.

References Cited in the file of this patent

UNITED STATES PATENTS

| | | |
|---|---|---|
| 2,162,828 | Slack | June 20, 1939 |
| 2,344,896 | Phelps | Mar. 21, 1944 |
| 2,372,849 | Phelps | Apr. 3, 1945 |
| 2,795,412 | Waisner | June 11, 1957 |